April 4, 1967  C. P. HALSTED  3,312,969
RADAR VIDEO PROCESSOR AND CLUTTER ELIMINATOR
Filed July 9, 1965
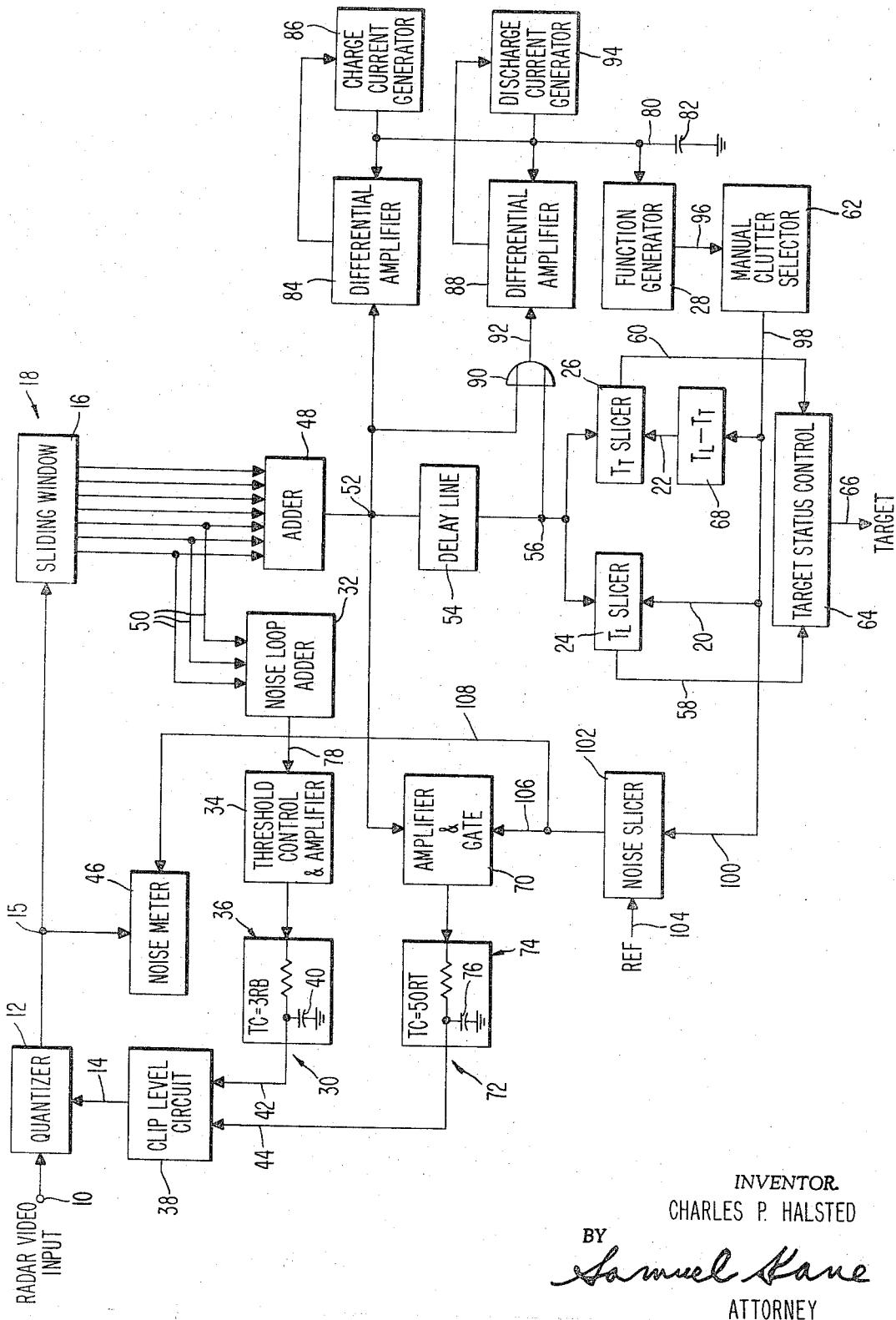
INVENTOR.
CHARLES P. HALSTED
BY
Samuel Kane
ATTORNEY

3,312,969
RADAR VIDEO PROCESSOR AND CLUTTER ELIMINATOR

Charles P. Halsted, Oreland, Pa., assignor to Burroughs Corporation, Detroit, Mich., a corporation of Michigan
Filed July 9, 1965, Ser. No. 470,740
18 Claims. (Cl. 343—5)

This invention relates generally to radar and more particularly to apparatus for detecting targets in clutter and no-clutter environments.

An object of the invention is to improve the detection of targets in a clutter environment by the provision of apparatus which effectively eliminates or reduces the clutter.

Another object of the invention is to reduce false alarms declared by radar video data processing systems in which the apparatus of the present invention may be used. In this regard, a false alarm is an indication that a target has been detected when in fact a target has not been detected.

Another object of the invention is the provision of apparatus which will respond instantly when clutter is encountered to control the clutter and will further respond instantly when clutter is passed to resume normal no-clutter operation, thereby further reducing the possibility of declaring false alarms due to clutter.

A further object of the invention is the provision of such apparatus by means of which the false alarm rate may be predetermined and controlled.

Another object of the invention is to improve flight controlling by the provision of apparatus which makes it possible to present uncluttered displays such as, for example, those which are presented on a Plan Position Indicator (PPI).

Another object of the invention is to place target detection on an automatic basis, if desired, and thus take away from the flight controller the task of making a sometimes doubtful decision as to whether the bright spots on the Plan Position Indicator scope are due to targets, noise or clutter.

Still another object of the invention is the provision of apparatus which will enable the utilization of the weak, as well as the strong, target return signals and thereby retain the probability of detecting targets through weak signals, even in the presence of clutter.

A further object of the invention is the provision of apparatus which will simplify the determination of range and azimuth positions of targets.

A further object of the invention is the provision of apparatus for statistically detecting the "illumination" or striking of a target by the radar beam, and for statistically determining the end of the target as the radar beam leaves the target.

A further object of the invention is the provision of apparatus for declaring targets on a statistical basis and which takes into account a predetermined percentage of radar receiver-generated noise.

Still a further object of the invention is the provision of apparatus which has the ability to modify its own statistical criteria in accordance with the magnitude of clutter whenever clutter is encountered.

In accordance with the above objects, and considered first in one of its broader aspects, the apparatus of the invention for processing the output of a radar receiver which includes receiver-generated noise signals and radar video signals is synchronized to the radar system by the radar timing signals and may comprise a circuit for establishing a variable clip level and means for quantizing into digital pulses those receiver output signals which are effective in magnitude to exceed the clip level magnitude. Means are provided which respond to variations in the duty cycle, as hereinafter defined, of the output of the quantizing means caused by variations in the frequency of the effective noise signals for adjusting the clip level to maintain the duty cycle substantially constant, and further means are provided which respond to variations in the duty cycle of the output of the quantizing means caused by effective clutter signals in the receiver output for adjusting the clip level to limit the number of effective clutter signals to be quantized.

The invention will be more clearly understood when the following detailed description of a specific embodiment thereof is read in conjunction with the accompanying drawing in which the single figure is a block diagram of apparatus constructed in accordance with the invention.

Turning now to the detailed description and referring to the accompanying drawing, the radar video input which is applied to a terminal 10 of a quantizer 12 of the illustrated apparatus of the invention is the output of a radar receiver which includes receiver-generated thermal or "white" noise and radar video signals. The radar video signals may include clutter return signals in addition to target return signals, both of which are derived from pulses of energy which are transmitted down a predetermined maximum range as the directional radar antenna rotates and scans the range and targets. Since the radar receiver output contains random noise as well as target return and clutter return signals, and also because of the fluctuations in target return signal strength due to target scintillation and other phenomena, the process of detecting targets is performed on a statistical basis, as will be discussed. A technique employed in video processing equipment, known as the "sliding window" detector, utilizes the statistical characteristics of the radar video to determine the presence of a target.

The radar video input is first converted to digital form by the quantizer 12. Functionally, the quantizer 12 and a multiple sliding window memory 18 sample the video over short periods of time comparable to the inherent radar resolution which in the case of the illustrated embodiment is ¼ mile intervals. If the amplitude of the video during sampling exceeds a variable preset threshold or clip level at 14 on the quantizer 12 a binary ONE appears at 15 at the output of the quantizer 12 for that ¼ mile interval and is transmitted and written into the corresponding sliding window 16 of the multiple sliding window memory 18. If the video amplitude does not exceed the threshold value at 14 a binary ZERO appears at the output at 15, and this likewise is transmitted and stored in the associated sliding window 16 of the memory. This process occurs in real time and the resulting train of digital pulses in the form of ONE's and ZERO's is digitally stored in the respective sliding windows 16 of the memory 18.

Since the amplitude of the receiver-generated noise is randomly distributed, some noise pulses as well as target returns will exceed the threshold at 14. Also, due to fluctuations in signal strength, some valid target returns will not be of sufficient amplitude to exceed the threshold at 14. Therefore, in order to make use of the weaker target return signals in the target detection process, it has been found to be workable, on a statistical basis, to let in a certain percentage of the noise signals and thereby increase the probability of detecting targets with the weaker signals. Otherwise, the weaker signals which are in among the noise, would not be available for detection purposes if all of the noise were excluded from the apparatus.

From the foregoing, it appears that it would be inadequate to declare a target on the basis that the quantizer threshold at 14 is exceeded on a single return. Thus, the apparatus of the invention examines the stored quantizer outputs at each range cell, or ¼ mile interval, for a number of radar sweeps. A "sweep" is known in the art as a radar trigger, or as a pulse of energy which is transmitted down the range.

The particular number of radar sweeps to be examined at each range cell is arbitrary, and depends, among other factors, upon the particular false alarm rate desired. Thus, assuming a radar with nine sweeps in a one-degree beamwidth, a maximum range of 200 miles, and range quantization of ¼ mile, the number of bits of memory required to store the entire two-dimensional beam pattern history is:

Number of range cells in one sweep ____ 200×4=800
Number of sweeps per beamwidth _____ = 9

Number of bits required _____ 7200

The stored beam pattern is continuously updated as the radar antenna rotates so that the oldest information is erased and the quantizer outputs at 15 for the latest sweep are written into the memory 18. The net effect is that the stored pattern at any given range cell, or range interval, forms a "window," in this case, nine azimuth bits wide, which may be thought of as sliding around the surveillance area at this particular range or range cell as the radar antenna rotates, and which always contains the latest pattern of hits in one beam width, or nine sweeps worth of information, in the example given, which hits are stored in the particular window in the form of binary digits or ONE's. Thus, in the example given, there is a sliding window memory unit 16 for each ¼ mile range cell, and each sliding window 16 is capable of storing nine bits of data.

The memory 18 may take various forms, one of which is a two-dimensional matrix of magnetic cores for storing bits. Thus, in the example given, the magnetic cores would be arranged in electrical rows and columns with each row containing 9 cores and each column containing 800 cores. Each row of 9 cores would then constitute a 9-bit sliding window 16 and there would be 800 of these sliding windows 16 in the memory 18, each corresponding to a range cell.

The 800 nine-bit sliding windows 16 are examined once each sweep, sequentially, as the new quantizer 12 output at 15 is written into the memory 18, to determine whether the number of hits in a particular sliding window 16 indicates the presence of a target. While there is a finite probability of there being a large number of noise bits in a particular sliding window 16, it has been shown that under normal quantizer threshold settings at 14, if approximately one more than half of the window bits contains ONE's, there is an extremely small probability that this is due to noise, and thus a target is declared, as will be described.

The percentage noise output from the quantizer 12, and leading and trailing edge threshold settings at 20 and 22 on the reference side of two slicer circuits 24 and 26, respectively, which constitute a statistical detector, together establish a predetermined net false alarm rate.

Radar returns due to clutter increase the percentage of quantizer 12 outputs at 15 in accordance with the magnitude of the clutter. To throttle the net false alarm rate, that is, to hold it at a predetermined value, the statistical thresholds at 20 and 22 are increased during clutter as a function of the magnitude of the clutter to a degree as specified by a function generator 28.

Starting with very mild clutter and increasing in magnitude, there will be some value of clutter which will fill some or all of the sliding window memory units 16 with ONE's. If each sliding window 16 becomes essentially full, no statistical detection can be achieved and a "heavy-clutter" indication may be given in any desirable manner, not forming a part of the present invention, as by causing a heavy-clutter flag to be raised. Such an indication means that at this point no subclutter visibility is possible. This situation would merely be the result of saturating the memory with ONE's, and would not be any more useful for target detection purposes than if the memory were saturated with all ZERO's. Thus, the apparatus of the invention provides means for allowing a certain amount of the clutter to be processed, on a statistical basis, in order to obtain the established net false alarm rate.

In order to allow heavier clutter to be processed by the apparatus before throwing up the heavy-clutter flag, a fast quantizer feedback loop 30 is provided. This loop includes the quantizer 12, the sliding window memory 18, a noise loop adder circuit 32, a threshold control and amplifier circuit 34, a fast-time-constant integrating circuit 36 and a clip level circuit 38. This fast quantizer feedback loop 30 derives a voltage for raising the clip level threshold voltage at 14 on the quantizer 12 in accordance with the clutter from sampling the first few bits in successive sliding windows 16 and integrating over a multiple-range-cell interval. The apparatus in the illustrated embodiment has been chosen to sample, by means of a simultaneous and parallel readout, the first three bits in each of three successive sliding windows or range cells 16 and then to integrate over this three-range-cell interval. The time constant (TC) of the integrating circuit 36 is indicated as being equal to three range boxes (3RB), or three range cells.

When the voltage on the capacitor 40 of the integrating circuit 36, which is derived from the multiple-range-cell sample, exceeds a preset threshold value which is established by the threshold control in circuit 34, the quantizer clip level at 14 is increased through the clip level circuit 38. The size of the sample taken is chosen to be small enough to permit action in clutter before the sliding window memory 18 saturates with ONE's, yet large enough to give reasonable assurance that the action being taken is due to clutter.

The quantizer 12 is a slicer circuit whose output is obtained by clipping it at two voltage levels, designed in binary notation, as indicated previously as ONE and ZERO. Radar video, including receiver-generated noise, applied at the input 10 to the quantizer 12 provides digital ONE outputs at 15 only when the video amplitude exceeds the threshold voltage at 14 which is obtained from the clip level circuit 38. The clip level circuit 38 may take various forms, one of which is that of a diode positive OR gate. In such case, the clip level circuit 38 will respond to that one of its input voltages at 42 or 44, whichever is most positive, and provide an output at the clip level 14.

The output at 15 of the quantizer 12 also appears as the input to a noise meter 46 which is basically a slide-back voltmeter with a null indicator. The voltage measured by the noise meter 46 is proportional to the percentage of time that the quantizer 12 output is in the ONE state. Stated in another way, the noise meter 46 measures and provides a visual indication of the duty cycle of the output of the quantizer 12, the duty cycle being the ratio of the time that the quantizer 12 output is in the ONE state to the total time that it could be in the ONE state due to thermal noise.

As the quantizer output at 15 addresses the memory 18, the output at 15 is written into the first bit of each one of the sliding windows 16 each time that a radar pulse is triggered. In other words, each time that there is a sweep the first column of 800 cores or bits will be addressed by the output at 15 and each bit of the column will have written into it a ONE or a ZERO. As new information is written into this column of bits at each subsequent sweep, and as the sliding windows 16 are read out, as will be explained, the old information is shifted to the next column of 800 bits in the memory 18, or from bit-to-bit in each sliding window 16, and this may be accomplished in the manner of a shift register. Thus, each sliding window 16 will contain the history of returns or hits, in the form of binary ONE's, for the associated range cell, and this information will continually be updated each time a sweep occurs.

Now at each sweep of the radar all of the sliding windows 16 are read out sequentially and the resulting signals from each sliding window provide inputs to an adder circuit 48, which converts these signals into an analog voltage at its output at 52. In a similar manner, the parallel readout at 50 of the first three bits or magnetic cores in the first three columns of each sliding window 16 is converted by the noise loop adder 32 to an analog voltage at its output at 78.

Each analog voltage at 52 is therefore a function of the number of ONE's in the sliding window 16 from which it is derived and, in the illustrated embodiment, it is preferrably proportional to this number of ONE's.

Now, if a target appears in the range at a single range cell, a large number of ONE's due to hits on the target will commence building up in the particular sliding window 16 associated with that range cell, as the radar beam moves across the target and as the target is repeatedly illuminated or "banged" with each sweep. Thus a large voltage will appear at the output 52 of the adder circuit 48 as the particular sliding window 16 is read out to indicate detection of a target, and this large voltage is sent through a multiple-range-cell delay line 54. In the present embodiment this delay line has been chosen to be a four-range-cell delay line.

After a time delay in the delay line 54 corresponding to the time equivalent of four range cells, the voltage, slightly attenuated, is applied at the output of the delay line as the input 56 to the two slicers 24 and 26. These slicers are similar to the quantizer 12 slicer and their outputs at 58 and 60, respectively, similarly move between two voltage levels, also designated in binary notation as ONE and ZERO. The voltages on the reference sides 20 and 22 of these slicers 24 and 26 are adjusted by means of a manual clutter selector 62 to correspond with leading and trailing edge detection threshold values for the condition of no clutter. As will appear later, the expression "leading edge detection threshold value" and "trailing edge detection threshold value" refer, respectively, to the threshold values at which the leading edge of the radar beam is considered statistically to illuminate the target and at which the trailing edge of the radar beam is considered statistically to have reached the end of the target.

The voltage required on the reference side 20 for leading edge detection is provided by the function generator 28. The voltage required on the reference side 22 for trailing edge detection is obtained by subtracting a voltage level from the reference voltage 20 applied to the slicer 24. The designations $T_L$ and $T_T$ are symbolic of "target leading edge" and "target trailing edge," respectively.

A target status control, or utilization device 64, declares a target by providing a predetermined output at 66 whenever both slicers 24 and 26 achieve the ONE state after they both have been in the ZERO state. The target status control 64 makes a declaration of end-of-target by providing a different output at 66 when both slicers 24 and 26 achieve ZERO state after they both have been in the ONE state. The voltage $T_L-T_T$ in block 68 represents a differential voltage.

The quantizer clip level at 14 is variably adjusted to provide the required percentage of noise output at 15 for varying amplitudes of input video. This adjustment is obtained by setting a reference voltage in an amplifier and gate circuit 70, which is part of a slow feedback loop circuit 72, and by observing the reading of the noise meter 46 until it shows the proper voltage corresponding to the required percentage of noise and to the required duty cycle of the quantizer 12 output. The greater the number of samples of noise, the greater will be the accuracy with which the noise can be controlled.

The slow feedback loop 72 includes the quantizer 12, the memory 18, adder circuit 48, amplifier and gate circuit 70, an integrating circuit 74, and the clip level circuit 38.

With the apparatus operating in clear weather, that is, in a no-clutter environment, and considering only noise, each analog voltage output of the adder circuit 48 at 52 represents noise contained in many sweeps, and which corresponds to a given range cell, and a succession of such analog voltages will appear sequentially as the sliding windows 16 are sequentially read out to provide inputs to the adder circuit 48. These successive output voltages at 52 are amplified by the amplifier in circuit 70 and integrated by the long-time-constant integrating circuit 74 to obtain a voltage on the capacitor 76 which is fed back through the clip level circuit 38 to establish the clip level voltage 14 of the quantizer 12. In this case, that is, in the absence of clutter, the voltage on the capacitor 76 which is the input 44 to the clip level circuit 38 is more positive than the voltage on the capacitor 40 which is the input 42 to the clip level circuit 38.

Now, if the frequency of the noise signals in the radar receiver output varies, there will be more or less ONE's in the output of the quantizer 12 so that the output of the adder circuit 48 will vary accordingly. Thus, if the frequency of the noise signals in the radar receiver output increases on the average over a relatively long time, the output voltage of the adder at 52 will increase accordingly and through the slow feedback loop 72 will raise the clip level voltage at 14, and thereby reduce the number of noise signals to be quantized. Thus, the output of the quantizer 12, with respect to noise, will always seek to maintain its duty cycle constant.

As indicated above, changes in frequency of the noise signals is considered on a long-time average basis, and the slow feedback loop circuit 72 responds to such changes by effectively examining the history in the memory 18 for many sweeps or triggers. Thus the long time constant (TC) of the integrating circuit 74 is indicated as being equal to 50 radar triggers (50RT).

Now, if a target is detected in a clear, no-clutter environment, a large voltage will appear at 52 at the output of the adder circuit 48 and this will appear generally only for a single range cell. That is, the output at 52 will generally be from only one sliding window 16 which corresponds to the particular range cell in which the target is located. This single large voltage signal at 52 is sent through the delay line 54 and after being slightly attenuated in the delay line, it is applied to the input of the two slicers 24 and 26. The purpose of the delay line 54 will appear later on when operation in clutter is discussed.

As indicated previously, the voltages on the reference side of the slicers 24 and 26 are adjusted to correspond with leading and trailing edge detection threshold values for the condition of no clutter. These threshold values are established on a statistical basis in order to obtain a predetermined false alarm rate. Thus, while there is a finite probability of there being a large number of noise bits in a sliding window 16, it has been shown that under normal quantizer threshold settings, if approximately one more than half of the window bits contains ONES's, there is an extremely small probability that this is due to noise, and thus a target is declared, as will be explained.

Thus, in the case of the illustrative nine-bit sliding window 16, whenever there are five ONE's stored in the sliding window this is taken statistically to indicate that the leading edge of the radar beam has detected a target. Also, whenever the number of ONE's in the sliding window falls to a predetermined number after detecting a target, for example three, this similarly is taken to indicate statistically that the trailing edge of the radar beam has left the end of the target.

Utilizing the above illustrative criteria of five ONE's for indicating a target and three ONE's for indicating end-of-target, it is assumed that for no-clutter conditions the threshold voltage at 20 is set by the manual clutter selector 62 to +5 volts and that the threshold voltage at 22, through the circuit in block 68, is similarly set to +3 volts. This makes the differential voltage $T_L-T_T$ in block 68 equal to two volts. It is also assumed that three or more ONE's in a sliding window 16 will result in a voltage at 56 which will exceed the threshold voltage at 22, and that five or more ONE's in a sliding window 16 will result in a voltage at 56 which will exceed the threshold at 20.

As the target returns or hits increase, the number of ONE's in the particular sliding window 16 will increase until it reaches a total of three ONE's. This will result in a voltage at 56 which exceeds the threshold at 22 but not the threshold at 20. Thus slicer 26 alone will swing from the ZERO state to the ONE state and produce an output at 60. However, no indication of target detection will be given by target status control 64 since that device requires coincident inputs from the outputs at 58 and 60.

As the target hits increase further, the number of ONE's in the particular sliding window will reach a total of five ONE's. This will result in a voltage at 56 which exceeds both threshold values at 20 and 22 so that both slicers 24 and 26 will swing from the ZERO state to the ONE state and provide simultaneous outputs at 58 and 60, thus causing target status control 64 to indicate detection of a target by providing a predetermined output at 66.

As the radar beam leaves the target, the number of ONE's stored in the particular sliding window 16 will become less since there will now be progressively fewer target return hits. Therefore, when the number of ONE's in the sliding window falls to a total of four ONE's, slicer 24 will switch back to the ZERO state but the slicer 26 will not switch back to the ZERO state until the number of ONE's falls to a total of three. When this occurs, both slicers 24 and 26 will achieve the ZERO state after they both have been in the ONE state and will again provide simultaneous outputs at 58 and 60. Upon the occurrence of this event, the target status control 64 will indicate end-of-target by again providing an output at 66.

It will now be assumed that the leading edge of the radar beam has entered a large dense cloud so that the apparatus will now be operating in clutter. This results in a succession of large analog voltages at 52 at the output of the adder circuit 48 and also at the output 78 of the noise loop adder 32 of the fast feedback loop 30. The succession of analog voltages at 78 is amplified and integrated over the three-range-cell period by means of the amplifier and integrator in circuits 34 and 36. The integrated voltage at 42 on the capacitor 40 is now more positive than the input voltage at 44 so that it is transmitted by the clip level circuit 38 to raise the clip level at 14 and thus throttle back the amount of clutter to be quantized.

Now, with respect to the sequence of analog voltages at 52, and first considering only one of these analog voltages, the voltage at 52 is larger than the voltage at 80 on a capacitor 82 thus causing a differential amplifier 84 to turn on a charge generator 86. The voltages at 52 and 56 are coupled to a differential amplifier 88 through an OR circuit 90 so that whenever the voltage at 52 or 56 is high the voltage at 92 at the output of the OR circuit is high. When the voltage at 92 is higher than the voltage at 80, a discharge current generator 94 is turned off.

As the successive analog voltages at 52 proceed through the delay line 64 and the voltage at 52 remains higher than the voltage at 80, the capacitor 82 continues to charge without being discharged. The charging time constant is so adjusted that by the time the leading edge of the fourth successive analog voltage at 52 gets through the delay line 54 to the slicers 24 and 26, the voltages at 20 and 22 on the reference side of the slicers will have been increased in proportion to the magnitude of the clutter by the function generator 28 whose output at 96 appears at 98 through the manual clutter selector circuit 62. The delay line 54 has provided a time over which the reference voltages at 20 and 22 of the slicers 24 and 26 could be adjusted in proportion to the number of radar returns in an area bounded by the range in the delay line, which in this particular example is four range cells, and the azimuth in the sliding windows, which in this example is nine sweeps. When the trailing edge of the last clutter voltage passes out of the delay line 54, the voltage at 92 drops.

With the voltage at 80 greater than the voltage at 92, the discharge current generator 94 turns on, lowering the voltage at 80 on the capacitor 82. During this time, the voltage at 52 is lower than the voltage at 80, so that the charge generator 86 is now off. The ratio of the charge and discharge currents could be other than unity to add increased flexibility to the function generation. The operation of apparatus 84, 86, 88 and 94 is such as not to provide any significant action on a single target although it operates effectively upon clutter.

The output 96 of the function generator 28 which appears at 98 is also the input at 100 to a noise slicer circuit 102 which is similar to the quantizer 12 slicer, and also similar to the two slicers 24 and 26, but which is provided with a fixed reference voltage at 104. When the input at 100 due to clutter exceeds the voltage at 104, the noise slicer 102 will switch from the ZERO state to the ONE state and provide an output at 106 and 108. The output at 106 disconnects the long-time-constant capacitor 76 from the adder circuit 48 by opening the gate in circuit 70 to cut off the inputs to the circuit 70 from the adder circuit 48, so that clutter outputs at 52 do not affect the clear-weather voltage on capacitor 76 which is required for instantly placing the quantizer clip level at 14 at its normal level when the apparatus is again operating in no clutter. By cutting off the inputs to the circuit 70 from the adder outputs at 52, the voltage on the capacitor 76 will be stabilized at its normal, no-clutter value, since its discharge at this time through the high output impedance of the amplifier in circuit 70 is negligible. Thus, as soon as the radar beam leaves the clutter area, the input at 100 ceases, the gate in circuit 70 closes and the slow feedback loop circuit 72 instantly receives outputs from 52 to place the clip level 14 at its established value without degradation due to clutter and commences normal operation for no-clutter conditions.

When the noise slicer 102 goes to the ONE state, it sends an inhibit pulse through its output at 108 to the noise meter 46 to cut off inputs to the noise meter from the quantizer 12 so that extended clutter will not influence the no-clutter noise meter reading when the apparatus resumes normal operation in a clutter-free environment.

Specifications for certain of the illustrated circuits for one embodiment of the invention utilizing the exemplary nine-bit sliding window are as follows:

I.—*Digital-to-Analog Converter—Adder and Noise Loop Adder Circuits 48 and 32*
    (1) Input: 9 individual bits and 3 individual bits, respectively, each bit producing a weighted output level
    (2) Input Signals Levels:
        ONE   —.3±.05 volt
        ZERO +2.9±.1 volts
    (3) Output Rise Time: 50 nanosec nominal
    (4) Output Level Per Step: 0.222 volt II.—*Function Generator 28*
    (1) Input Voltage: 0 to +4 volts
    (2) Output Voltages: 0 to +4 volts with break points to simulate automatic clutter eliminator (ACE) detection criteria curve III.—±*Differential Amplifier and Current Generator Circuits 84, 86, 88 and 94*
   (1) Input Voltage: 0 to +4 volts
   (2) Gain: Unity (non-inverting)

IV.—*Slicer—Including Quantizer Slicer-Circuits 12, 24, 26 and 102*
   (1) Input Voltage: 0 to +8 volts
   (2) Output Voltage:
      ONE  +3.3±.3 volts
      ZERO  −.3±.2 volt
   (3) Output Loading: 2 AND-gate loads (4.4 ma. nominal)
   (4) Rise Time: 60 nanosecs.
   (5) Fall Time: 90 nanosecs.

V.—*Noise Meter 46*
   (1) Input: −0.3 volt to +3.3 volts (nominal) from Quantizer
   (2) Input Duty Cycle: 2%–25%
   (3) Input Period: Random, 0.83 $\mu$sec. to 2.78 msecs.
   (4) Clutter Inhibit Input:
      +3 volts to enable
      0 volt to inhibit
   (5) Accuracy: 10%
   (6) Output Indication: Null type meter While there has been disclosed a specific apparatus to exemplify the principles of the invention, it is to be understood that this is but one embodiment thereof, and that the invention is capable of being constructed in a variety of modifications without departing from the true spirit and scope thereof. Accordingly, it is to be understood that the invention is not to be limited by the specific apparatus disclosed, but only by the subjoined claims.

What is claimed is:

1. Apparatus for processing the output of a radar receiver which includes receiver-generated noise signals and radar video signals, said radar video signals including target return signals and clutter return signals which are derived from pulses of energy which are transmitted down a predetermined maximum range divided into a number of range cells, said apparatus comprising a circuit for establishing a preset variable clip level, quantizing means connected to receive the output signals of said radar receiver for generating digital pulses of a first level when said output signals are effective to exceed said variable clip level and digital pulses of a second level when said output signals do not exceed said clip level, a first loop circuit responsive to variations in the duty cycle of the output of the quantizing means caused by variations in the frequency of effective noise signals for adjusting the clip level to maintain said duty cycle substantially constant, a second loop circuit actuated by variations in said duty cycle caused by effective clutter signals in the receiver output for adjusting the clip level to limit the number of effective clutter signals to be quantized, means for measuring and providing a visual indication of variations in said duty cycle due to variations in said frequency, means for stabilizing the output of said first loop circuit and for inhibiting the input to said measuring means when effective clutter signals cause an input level of the stabilizing means to exceed a predetermined threshold, a plurality of memory units for storing said digital pulses as binary digits, each memory unit being adapted to store digital pulses of said second level as well as digital pulses which originated as noise signals and digital pulses whose associated return signals originated in one of said range cells, means establishing a variable target detection signal level, means for deriving individual analog signals from each memory unit, each analog signal being proportional to the number of binary digits in the associated memory unit which are derived from digital pulses of one of said first and second levels, indicating means actuated by a said analog signal which exceeds said target detection signal level for indicating detection of a target, means responsive to a plurality of said individual analog signals which are derived from a plurality of said memory units and caused by clutter return signals for varying said target detection signal level to maintain a predetermined false alarm rate, and a delay circuit connected to transmit each analog signal to said indicating means in a time to permit said varying means to first vary said target detection signal level.

2. Apparatus for processing the output of a radar receiver which includes receiver-generated noise signals and radar video signals, said radar video signals including target return signals and clutter return signals which are derived from pulses of energy which are transmitted down a predetermined maximum range divided into a number of range cells, said apparatus comprising a circuit for establishing a preset variable clip level, quantizing means connected to receive the output signals of said radar receiver for generating digital pulses of a first level when said output signals are effective to exceed said variable clip level and digital pulses of a second level when said output signals do not exceed said clip level, a first loop circuit responsive to variations in the duty cycle of the output of the quantizing means caused by variations in the frequency of effective noise signals for adjusting the clip level to maintain said duty cycle substantially constant, a second loop circuit actuated by variations in said duty cycle caused by effective clutter signals in the receiver output for adjusting the clip level to limit the number of effective clutter signals to be quantized, means responsive to effective clutter signals for stabilizing the output of said first loop circuit, a plurality of memory units for storing said digital pulses as binary digits, each memory unit being adapted to store digital pulses of said second level as well as digital pulses which originated as noise signals and digital pulses whose associated return signals originated in one of said range cells, means establishing a variable target detection signal level, means for deriving individual analog signals from each memory unit, each analog signal being proportional to the number of binary digits in the associated memory unit which are derived from digital pulses of one of said first and second levels, indicating means actuated by a said analog signal which exceeds said target detection signal level for indicating detection of a target, means responsive to a plurality of said individual analog signals which are derived from a plurality of said memory units and caused by clutter return signals for varying said target detection signal level to maintain a predetermined false alarm rate, and a delay circuit arranged to transmit each analog signal to said indicating means in a time to permit said varying means to first vary said target detection signal level.

3. Apparatus for processing the output of a radar receiver which includes receiver-generated noise signals and radar video signals, said radar video signals including target return signals and clutter return signals which are derived from pulses of energy transmitted down a predetermined maximum range which is divided into a number of range cells, said apparatus comprising a circuit for establishing a preset variable clip level, quantizing means connected to receive the output signals of said radar receiver for generating digital pulses of a first level when said output signals are effective to exceed said variable clip level and digital pulses of a second level when said output signals do not exceed said clip level, a first loop circuit responsive to variations in the duty cycle of the output of the quantizing means caused by variations in the frequency of effective noise signals for adjusting the clip level to maintain said duty cycle substantially constant, a second loop circuit actuated by variations in said duty cycle caused by effective clutter signals in the receiver output for adjusting the clip level to limit the number of effective clutter signals to be quantized, a plurality of memory units for storing said digital pulses as binary digits, each memory unit being adapted to store digital pulses of said second level as well as digital pulses which originated as noise signals and digital pulses whose associated return signals originated in one of said range cells, means establishing a variable target detection signal level, means for deriving individual analog signals from each memory unit, each analog signal being proportional to the number of binary digits in the associated memory unit which are derived from digital pulses of one of said first and second levels, indicating means actuated by a said analog signal which exceeds said target detection signal level for indicating detection of a target, means responsive to a plurality of said individual analog signals which are derived from a plurality of said memory units and caused by clutter return signals for varying said target detection signal level to maintain a predetermined false alarm rate, and a delay circuit connected to transmit each analog signal to said indicating means in a time to permit said varying means to first vary said target detection signal level.

4. Apparatus for processing the output of a radar receiver which includes receiver-generated noise signals and radar video signals, said radar video signals including target return signals and clutter return signals which are derived from pulses of energy which are transmitted down a predetermined maximum range divided into a number of range cells, said apparatus comprising a circuit for establishing a preset variable clip level, quantizing means connected to receive the output signals of said radar receiver for generating digital pulses of a first level when said output signals are effective to exceed said variable clip level and digital pulses of a second level when said output signals do not exceed said clip level, a first loop circuit responsive to variations in the duty cycle of the input of the quantizing means caused by variations in the frequency of effective noise signals for adjusting the clip level to maintain said duty cycle substantially constant, a second loop circuit actuated by variations in said duty cycle caused by effective clutter signals in the receiver output for adjusting the clip level to limit the number of effective clutter signals to be quantized, a plurality of memory units for storing said digital pulses as binary digits, each memory unit being adapted to store digital pulses of said second level as well as digital pulses which originated as noise signals and digital pulses whose associated return signals originated in one of said range cells, means establishing a variable target detection signal level, means for deriving individual analog signals from each memory unit, each analog signal being proportional to the number of binary digits in the associated memory unit which are derived from digital pulses of one of said first and second levels, indicating means actuated by a said analog signal which exceeds said target detection signal level for indicating detection of a target, and means responsive to a plurality of said individual analog signals which are derived from a plurality of said memory units and caused by clutter return signals for varying said target detection signal level to maintain a predetermined false alarm rate.

5. Apparatus for processing target return signals and clutter return signals which are derived from pulses of energy which are transmitted down a predetermined maximum range divided into a number of range cells comprising quantizing means arranged to receive said return signals for generating digital pulses of a first level when said return signals exceed a predetermined threshold and digital pulses of a second level when said return signals do not exceed said threshold, means for measuring and providing a visual indication of the duty cycle of the output of said quantizing means, a plurality of memory units for storing said digital pulses as binary digits, each memory unit being adapted to store digital pulses of said second level as well as digital pulses whose associated return signals orignated in one of said range cells, means establishing a variable target detection signal level, means for deriving individual analog signals from each memory unit, each analog signal being proportional to the number of binary digits in the associated memory unit which are derived from digital pulses of one of said first and second levels, indicating means actuated by a said analog signal which exceeds said target detection signal level for indicating detection of a target, and means responsive to a plurality of said individual analog signals which are derived from a plurality of said memory units and caused by clutter return signals for varying said target detection signal level to maintain a predetermined false alarm rate.

6. Apparatus for processing target return signals and clutter return signals which are derived from pulses of energy which are transmitted down a predetermined maximum range divided into a number of range cells comprising quantizing means arranged to receive said return signals for generating digital pulses of a first level when said return signals exceed a predetermined threshold and digital pulses of a second level when said return signals do not exceed said threshold, a plurality of memory units for storing said digital pulses as binary digits, each memory unit being adapted to store digital pulses of said second level as well as digital pulses whose associated return signals originated in one of said range cell, means establishing a variable target detection signal level, means for deriving individual analog signals from each memory unit, each analog signal being a function of the number of binary digits in the associated memory unit which are derived from digital pulses of one of said first and second levels, indicating means actuated by a said analog signal which exceeds said target detection signal level for indicating detection of a target, means responsive to a plurality of said individual analog signals which are derived from a plurality of said memory units and caused by clutter return signals for varying said target detection signal level to maintain a predetermined false alarm rate, and a delay circuit connected to transmit each analog signal to said indicating means in a time to permit said varying means to first vary said target detection signal level.

7. Apparatus for processing analogue target return signals and clutter return signals which are derived from pulses of energy which are transmitted down a predetermined maximum range divided into a number of range cells comprising quantizing means arranged to receive said return signals for generating digital pulses of a first level for each of said range cells when said return signals exceed a predetermined threshold and digital pulses of a second level for each of said range cells when said return signals do not exceed said threshold, a plurality of memory units for storing said digital pulses as binary digits, each memory unit being adapted to store digital pulses of said second level as well as digital pulses whose associated return signals originated in one of said range cells, means establishing a variable target detection signal level, means for deriving individual analog signals from each memory unit, each analog signal being a function of the number of binary digits in the associated memory unit which are derived from digital pulses of one of said first and second levels, indicating means actuated by a said analog signal which exceeds said target detection signal level for indicating detection of a target, and means responsive to a plurality of said individual analog signals which are derived from a plurality of said memory units and caused by clutter return signals for varying said target detection signals level to maintain a predetermined false alarm rate.

8. Apparatus for processing the output of a radar receiver which includes receiver-generated noise signals and radar video signals comprising a circuit for establishing a preset variable clip level, quantizing means connected to receive the output signals of said radar receiver for generating digital pulses to a first level when said output signals are effective to exceed said variable clip level and digital pulses of a second level when said output signals do not exceed said clip level, means for measuring and providing a visual indication of variations in the duty cycle of the output of said quantizing means, a first loop circuit responsive to variations in said duty cycle caused by variations in the frequency of effective noise signals for adjusting the clip level to maintain said duty cycle substantially constant, a second loop circuit actuated by variations in said duty cycle caused by effective clutter signals in the receiver output for adjusting the clip level to limit the number of effective clutter signals to be quantized, and means responsive to effective clutter signals for stabilizing the output of the first loop circuit and for inhibiting the input to said measuring means.

9. Apparatus for processing the output of a radar receiver which includes receiver-generated noise signals and radar video signals comprising a circuit for establishing a preset variable clip level, quantizing means connected to receive the output signals of said radar receiver for generating digital pulses of a first level when said output signals are effective to exceed said variable clip level and digital pulses of a second level when said output signals do not exceed said clip level, a first loop circuit responsive to variations in the duty cycle of the output of the quantizing means caused by variations in the frequency of effective noise signals for adjusting the clip level to maintain said duty cycle substantially constant, a second loop circuit actuated by variations in said duty cycle caused by effective clutter signals in the receiver output for adjusting the clip level to limit the number of effective clutter signals to be quantized, and means responsive to effective clutter signals for stabilizing the output of the first loop circuit.

10. Apparatus for processing target return signals which are derived from pulses of energy which are transmitted down a predetermined maximum range divided into a number of range cells comprising quantizing means arranged to receive said return signals for generating digital pulses of a first level when said return signals exceed a predetermined threshold and digital pulses of a second level when said return signals do not exceed said threshold, means for measuring and providing a visual indication of the duty cycle of the output of said quantizing means, a plurality of memory units for storing said digital pulses as binary digits, each memory unit being adapted to store digital pulses of said second level as well as digital pulses whose associated return signals originated in one of said range cells, means for deriving individual signals from each memory unit, and means actuated by one of said individual signals for indicating detection of a target when the number of predetermined ones of binary digits in the memory unit associated with said individual signal reaches a predetermined value, said predetermined ones of binary digits being derived from digital pulses of one of said first and second levels.

11. Apparatus for processing target return signals which are derived from pulses of energy which are transmitted down a predetermined maximum range divided into a number of range cells comprising quantizing means arranged to receive said return signals for generating digital pulses of a first level when said return signals exceed a predetermined threshold and digital pulses of a second level when said return signals do not exceed said threshold, a plurality of memory units for storing said digital pulses as binary digits, each memory unit being adapted to store digital pulses of said second level as well as digital pulses whose associated return signals originated in one of said range cells, means for deriving individual signals from each memory unit, and indicating means actuated by one of said individual signals for indicating detection of a target when the number of predetermined ones of binary digits in the memory unit associated with said individual signal reaches a predetermined value, said predetermined ones of binary digits being derived from digital pulses of one of said first and second levels.

12. Apparatus according to claim 11 wherein said indicating means will indicate the end of a target when the number of said predetermined ones of binary digits in said associated memory unit changes to a second predetermined value after first having reached said first mentioned predetermined value.

13. Apparatus for processing the output of a radar receiver which includes receiver-generated noise signals and radar video signals comprising a circuit for establishing a variable clip level, means for quantizing into digital pulses those receiver output signals which are effective in magnitude to exceed the clip level magnitude, means responsive to variations in the duty cycle of the output of the quantizing means caused by variations in the frequency of effective noise signals for adjusting the clip level to maintain said duty cycle substantially constant, and means responsive to variations in said duty cycle caused by effective clutter signals in the receiver output for adjusting the clip level to limit the number of effective clutter signals to be quantized.

14. Apparatus for identifying targets in the presence of clutter comprising receiver means for presenting a sequence of video signals corresponding to a single sweep radar return, with each successive sequence corresponding to an adjacent azimuth radar return and being broken down into a number of range cells each comprising range cell bits, quantizing means generating binary output pulses of ONE's or ZERO's depending upon whether or not the video signals for successive range cells exceed a variable preset threshold clip level, storage means including a plurality of registers, each register connected to receive said binary output pulses comprising the bits of a single range cell and for a plurality of successive azimuth radar returns, a digital-to-analogue converter having input means being connected successively to said registers in range sequence and providing weighted output levels in response to the signal returns, target detection means responsive to said weighted output levels at each range cell for declaring a target when a predetermined output level is exceeded, and analogue function control means for raising said predetermined output level in the presence of clutter when said weighted output level rises during a plurality of successive radar range cells.

15. Apparatus for identifying targets as defined in claim 14 wherein said function control means includes a storage capacitor connected as one input to a differential amplifier and a second input thereof connected to said converter, current charge means for said capacitor enabled when the weighted output levels at a single range exceed the storage level of said capacitor, delay means between said converter and said target detection means capable of delaying said weighted output levels for a time equivalent to a plurality of range cell returns in order to permit said capacitor to charge sufficiently in the presence of extensive clutter to raise said predetermined output level.

16. Apparatus for identifying targets as defined in claim 14 wherein said threshold clip level is controlled by a fast time constant feedback network connected between said storage means and said quantizing means, said network including an integrator whose input is connected to a feedback digital-to-analogue converter which receives a binary input from the leading radar returns only of successive registers, the time constant of said integrator being equivalent to a small number of range cells so as to permit the threshold clip level to rapidly follow clutter return signals in order to prevent said storage means from becoming saturated with ONE's which would prevent the recognition of valid target returns in the presence of clutter.

17. Apparatus for identifying targets as defined in claim 14 wherein said target detection means includes identifying means for locating the leading and trailing edge azimuth of each valid target.

18. Apparatus for identifying targets as defined in claim 17 wherein said identifying means includes a pair of slicer circuits with one input of each slicer circuit connected to said converter, the other input of one of said pair connected directly to said function control means and the other input of the second of said pair connected to said function control means by means of a fixed voltage subtracting circuit.

No references cited.

CHESTER L. JUSTUS, *Primary Examiner.*

RODNEY D. BENNETT, *Examiner.*